United States Patent
Zhou et al.

(10) Patent No.: US 9,480,083 B2
(45) Date of Patent: Oct. 25, 2016

(54) DEDICATED PILOT DECODING METHOD AND USER EQUIPMENT

(71) Applicant: HUAWEI TECHNOLOGIES CO., LTD., Shenzhen, Guangdong (CN)

(72) Inventors: Huan Zhou, Shenzhen (CN); Fan Wang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 14/328,884

(22) Filed: Jul. 11, 2014

(65) Prior Publication Data

US 2014/0348086 A1    Nov. 27, 2014

Related U.S. Application Data

(63) Continuation of application No. PCT/CN2013/070021, filed on Jan. 4, 2013.

(30) Foreign Application Priority Data

Jan. 13, 2012    (CN) .......................... 2012 1 0010863

(51) Int. Cl.
    *H04W 74/00*      (2009.01)
    *H04W 74/08*      (2009.01)
    (Continued)

(52) U.S. Cl.
    CPC ........... *H04W 74/006* (2013.01); *H04B 1/707* (2013.01); *H04W 74/0866* (2013.01); *H04W 88/022* (2013.01)

(58) Field of Classification Search
    CPC ....................... H04W 74/006; H04W 74/0866
    USPC .......................................................... 370/491
    See application file for complete search history.

(56) References Cited

U.S. PATENT DOCUMENTS

| | | | |
|---|---|---|---|
| 6,535,502 B1* | 3/2003 | Brink ..................... | H04B 1/707 370/345 |
| 7,218,617 B1 | 5/2007 | Usuda et al. | |
| 7,697,466 B2 | 4/2010 | Hashimoto et al. | |

(Continued)

FOREIGN PATENT DOCUMENTS

| CN | 101390318 A | 3/2009 |
|---|---|---|
| CN | 101420744 A | 4/2009 |

(Continued)

OTHER PUBLICATIONS

Extended European Search Report issued Jan. 14, 2015 in corresponding European Patent Application No. 13736259.6.

(Continued)

*Primary Examiner* — Warner Wong
(74) *Attorney, Agent, or Firm* — Staas & Halsey LLP

(57) ABSTRACT

Embodiments of the present invention provide a dedicated pilot decoding method and a user equipment. The method includes: determining a set of a dedicated pilot's channelization codes; receiving downlink control information sent by a base station; determining, according to the downlink control information, a dedicated pilot's channelization codes from the set of a dedicated pilot's channelization codes; and using the dedicated pilot's channelization codes to decode a dedicated pilot. The embodiments of the present invention may implement determining of a dedicated pilot's channelization codes and decoding of a dedicated pilot.

15 Claims, 3 Drawing Sheets

(51) Int. Cl.
*H04B 1/707* (2011.01)
*H04W 88/02* (2009.01)

(56) References Cited

U.S. PATENT DOCUMENTS

| | | | | |
|---|---|---|---|---|
| 7,751,304 | B2* | 7/2010 | Ro | H04B 1/69 370/203 |
| 8,675,616 | B2* | 3/2014 | Herrmann | H04W 4/06 370/338 |
| 2001/0033604 | A1* | 10/2001 | Ando | H04B 1/7097 375/147 |
| 2003/0054768 | A1* | 3/2003 | Challa | H04L 27/0014 455/63.1 |
| 2003/0072282 | A1* | 4/2003 | Liang | H04B 1/7107 370/335 |
| 2004/0042536 | A1* | 3/2004 | Rowitch | H04B 1/70751 375/150 |
| 2007/0066241 | A1* | 3/2007 | Hart | H04W 52/34 455/69 |
| 2007/0133390 | A1* | 6/2007 | Luo | H04B 1/7083 370/208 |
| 2008/0144600 | A1* | 6/2008 | Anderson | H04W 28/06 370/350 |
| 2009/0103479 | A1 | 4/2009 | Goto et al. | |
| 2009/0103497 | A1 | 4/2009 | Fernandez-Corbaton et al. | |
| 2009/0154441 | A1* | 6/2009 | Hu | H04J 13/10 370/342 |
| 2009/0238144 | A1* | 9/2009 | Cave | H04W 36/0055 370/331 |
| 2009/0296679 | A1 | 12/2009 | Bastug et al. | |
| 2010/0246539 | A1 | 9/2010 | Guillouard et al. | |
| 2010/0260119 | A1 | 10/2010 | Kishiyama et al. | |
| 2011/0201324 | A1* | 8/2011 | Persson | H04W 24/10 455/422.1 |
| 2012/0082192 | A1* | 4/2012 | Pelletier | H04W 52/42 375/219 |
| 2012/0281688 | A1 | 11/2012 | Xu et al. | |
| 2013/0155968 | A1* | 6/2013 | Pelletier | H04L 5/0023 370/329 |
| 2015/0245381 | A1* | 8/2015 | Nammi | H04L 5/0051 370/329 |

FOREIGN PATENT DOCUMENTS

| | | |
|---|---|---|
| CN | 101848030 A | 9/2010 |
| KR | 10-2008-0031561 | 4/2008 |
| WO | 2009/044710 A1 | 4/2009 |
| WO | 2011/050589 A1 | 5/2011 |

OTHER PUBLICATIONS

International Search Report mailed Apr. 11, 2013, in corresponding International Patent Application No. PCT/CN2013/070021.
Chinese Office Action issued Jul. 1, 2015 in corresponding Chinese Patent Application No. 201210010863.8.
International Search Report issued Apr. 11, 2013 in corresponding International Patent Application No. PCT/CN2013/070021.
Chinese Office Action dated Feb. 14, 2016 in corresponding Chinese Patent Application No. 201210010863.8, 6 pages.

* cited by examiner

DEDICATED PILOT DECODING METHOD AND USER EQUIPMENT

CROSS-REFERENCE TO RELATED APPLICATIONS

This application is a continuation of International Application No. PCT/CN2013/070021, filed on Jan. 4, 2013, which claims priority to Chinese Patent Application No. 201210010863.8, filed on Jan. 13, 2012, both of which are hereby incorporated by reference in their entireties.

TECHNICAL FIELD

The present invention relates to radio communications technologies, and in particular, to a dedicated pilot decoding method and a user equipment.

BACKGROUND

After Multiple Input Multiple Output (Multiple Input Multiple Output, MIMO) is introduced into a downlink of Wideband Code Division Multiple Access (Wideband Code Division Multiple Access, WCDMA), the throughput of a cell can be improved. A pilot mode that may be used in 4-transmit antenna MIMO may be simultaneous transmission of a common pilot (Common Pilot) and a dedicated pilot (Dedicated Pilot), where the common pilot is used for channel estimation and generating Precoding Control Indication (Precoding Control Indication, PCI), and the dedicated pilot is used for decoding data. This mode can reduce the amount of precoding information of which a base station (NodeB) informs a user equipment (User Equipment, UE). The number of dedicated pilots is related to the number of data layers, and therefore the NodeB needs to inform a UE of a channelization code used by a downlink dedicated pilot, so as to allow the UE to decode the obtained dedicated pilot. However, there is no specific solution where the NodeB informs a UE of a channelization code of a dedicated pilot in the prior art.

SUMMARY

Embodiments of the present invention provide a dedicated pilot decoding method and a user equipment to implement that a UE is capable of obtaining a dedicated pilot's channelization code informed by a NodeB and to implement decoding of the dedicated pilot.

An embodiment of the present invention provides a dedicated pilot decoding method including:
determining a set of a dedicated pilot's channelization codes;
receiving downlink control information sent by a base station;
determining, according to the downlink control information, dedicated pilot's channelization codes from the set of a dedicated pilot's channelization codes; and
using the dedicated pilot's channelization codes to decode a dedicated pilot.

An embodiment of the present invention provides a user equipment, including:

It may be seen from the technical solution that, in the embodiments of the present invention, a used dedicated pilot's channelization codes can be determined from a set of a dedicated pilot's channelization codes through downlink control information, so as to further implement decoding of a dedicated pilot.

DESCRIPTION OF EMBODIMENTS

Figure 1:
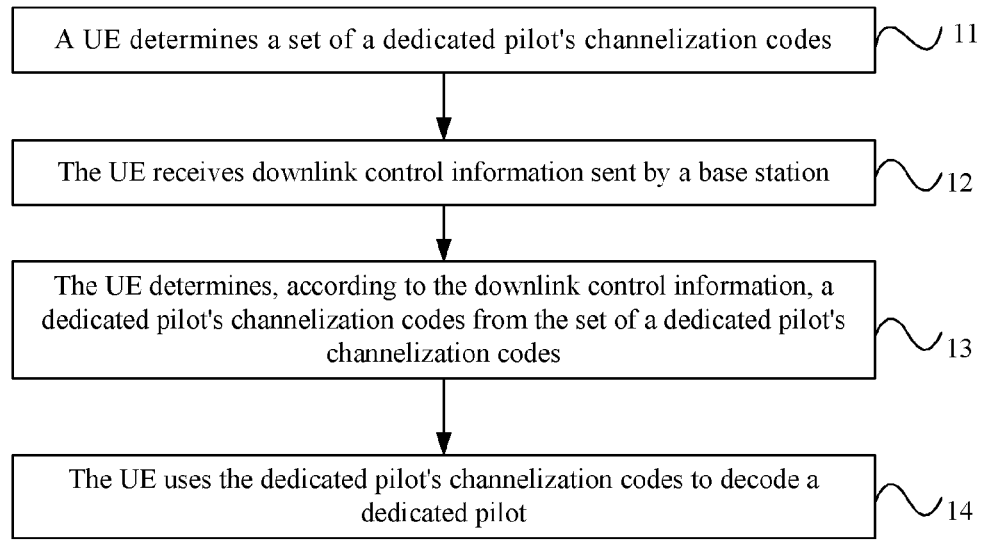
FIG. 1 is a schematic flow chart of a dedicated pilot decoding method according to an embodiment of the present invention.

FIG. 1 is a schematic flow chart of a dedicated pilot decoding method according to an embodiment of the present invention, where the method includes the following steps.

Step 11: A UE determines a set of a dedicated pilot's channelization codes;

A set of fixed channelization codes of a dedicated pilot may be preset. For example, a fixed spread factor (Spread Factor, SF) may be preset in the UE, and the set of a dedicated pilot's channelization codes is determined through the fixed SF; or N fixed channelization codes of a dedicated pilot may be preset in the UE, where the fixed channelization codes of a dedicated pilot compose a set of a dedicated pilot's channelization codes.

Step 12: The UE receives downlink control information sent by a base station;

For example, the UE receives high speed shared control channel (High Speed Shared Control Channel, HS-SCCH) information delivered by the base station.

Step 13: The UE determines, according to the downlink control information, a dedicated pilot's channelization codes from the set of a dedicated pilot's channelization codes;

For example, the HS-SCCH includes information that is used for indicating a location of a dedicated pilot. The UE may directly determine, according to the information that is used for indicating the location of a dedicated pilot, a dedicated pilot from the determined set of dedicated pilots;

or the HS-SCCH includes the number of data layers. The UE selects, from the determined set of a dedicated pilot's channels, the same number of dedicated pilots as that of data layers as determined dedicated pilots;

or the HS-SCCH includes the number of data layers. The UE may also use its own HS-SCCH's code channel number as an initial location to select, from the determined set of a dedicated pilot's channels, the same number of dedicated pilots as that of data layers as a determined dedicated pilot;

or the HS-SCCH includes the number of data layers and an initial code channel number of a high speed physical downlink shared channel (High Speed Physical Downlink Shared Channel, HS-PDSCH). The UE uses the initial code channel number of the HS-PDSCH as an initial location to select, from the determined set of a dedicated pilot's channels, the same number of dedicated pilots as that of the data layers as determined dedicated pilots.

Step 14: The UE uses the dedicated pilot's channelization codes to decode a dedicated pilot.

After successfully decoding an HS-SCCH by using its own UE ID, the UE is capable of obtaining data in itself, and then is capable of obtaining a dedicated pilot in its own data. For example, in an existing protocol, it is specified that a dedicated pilot is transmitted in a dedicated pilot channel of 2 time slots (slots) after the HS-SCCH. Therefore, after successfully decoding the HS-SCCH, the UE is capable of receiving its own dedicated pilot in a dedicated pilot's channel of 2 time slots after the HS-SCCH that is successfully decoded, and then may use the determined dedicated pilot's channelization codes to perform decoding on a dedicated pilot.

In this embodiment, a used dedicated pilot's channelization codes can be determined from a set of a dedicated pilot's channelization codes through downlink control information, so as to further implement decoding of a dedicated pilot.

Figure 2:
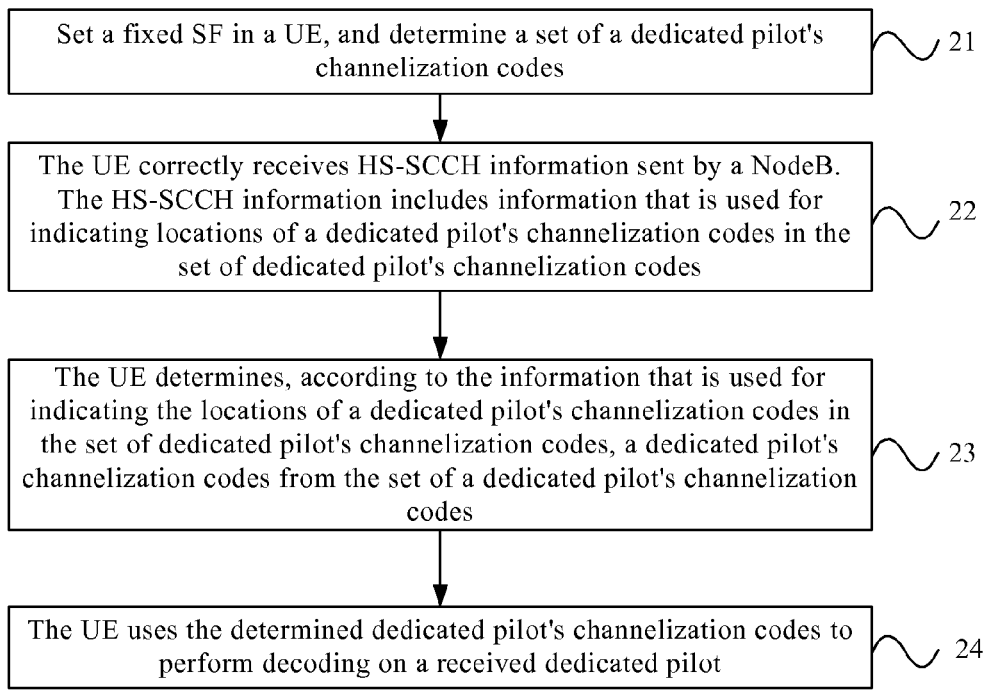
FIG. 2 is a schematic flow chart of a dedicated pilot decoding method according to another embodiment of the present invention.

FIG. 2 is a schematic flow chart of a dedicated pilot decoding method according to another embodiment of the present invention, where the method includes the following steps.

Step 21: Set a fixed SF in a UE, and determine, according to the set SF, a set of a dedicated pilot's channelization codes.

In an existing protocol, it is specified that a channel's spreading factors all use an Orthogonal Variable Spreading Factor (Orthogonal Variable Spreading Factor, OVSF) code. Spreading changes a data symbol into a chip and increases signal bandwidth. Each symbol's chip is called a spreading factor (SF). Spreading may be obtained by multiplying a data symbol and an OVSF code. A channelization code uses an OVSF code that is usually represented as $C_{ch,SF,k}$, where SF indicates a spreading factor, k indicates a code number, and $0 \leq k \leq SF-1$.

Because the UE in a downlink dedicated physical control channel (DPCCH) may support SF=256, if SF4's spreading factor is used, 64 dedicated pilots may be simultaneously scheduled to the UE; if SF64 is used, 4 dedicated pilots may be simultaneously scheduled.

Therefore, after a dedicated pilot's spreading factor is determined, the possible number of spreading factors is determined, and a set of a dedicated pilot's channelization codes is fixed. For example, when SF=64 is used, 4 dedicated pilots may be simultaneously scheduled.

Take SF=64 as an example. Combine dedicated pilot's channelization codes corresponding to 4 dedicated pilots in ascending order into a set of a dedicated pilot's channelization codes. A code number may uniquely identify a dedicated pilot's channelization code. Serial numbers of the 4 dedicated pilots' channelization codes in the set are 0, 1, 2, and 3 respectively. Then, the determined set of a dedicated pilot's channelization codes may be represented as {0,1,2, 3}. For example, code numbers of the 4 dedicated pilots' channelization codes are a, b, c, and d respectively. Supposing a<b<c<d, after the 4 dedicated pilots' channelization codes are combined into a set, the correspondence between code numbers of a dedicated pilot's channelization codes and serial numbers of a dedicated pilot's channelization codes in the set is: the corresponding serial numbers of a, b, c, and d are 0, 1, 2, and 3 respectively.

Optionally, a set of fixed channelization codes of a dedicated pilot may be directly set in a UE. For example, a dedicated pilot's channelization codes whose code numbers are a, b, c, and d respectively are directly configured in the UE to compose a set of a dedicated pilot's channelization codes.

Optionally, a NodeB may deliver to the UE higher layer signaling, such as wireless resource control protocol signaling of a wireless interface between the UE and a Universal Terrestrial Radio Access Network (Universal Terrestrial Radio Access Network, UTRAN). The higher layer signaling indicates a dedicated pilot's channelization codes used by the UE. The UE determines, according to indication information, the indicated dedicated pilot's channelization codes. The dedicated pilot's channelization codes compose a set of a dedicated pilot's channelization codes.

Step 22: The UE receives HS-SCCH information sent by the NodeB. The HS-SCCH information includes information that is used for indicating locations of a dedicated pilot's channelization codes in the set of a dedicated pilot's channelization codes.

The foregoing location information may be indicated in an explicit or implicit mode.

For example, the HS-SCCH includes the number of a dedicated pilot's channelization codes and an initial offset (offset) of a dedicated pilot's channelization codes;

or, the HS-SCCH includes the number of data layers (Layers) and an initial offset of a dedicated pilot's channelization codes.

In addition, the UE may listen for a plurality of HS-SCCHs simultaneously and decodes an HS-SCCH by using its own UE ID after listening for the HS-SCCH. If an HS-SCCH can be successfully decoded, it indicates that the HS-SCCH is correctly received. Information in the correctly received HS-SCCH is used to perform subsequent processing.

Step 23: The UE determines, according to the information that is used for indicating the locations of a dedicated pilot's channelization codes in the set of a dedicated pilot's channelization codes, a dedicated pilot's channelization codes from the set of a dedicated pilot's channelization codes.

For example, the determined set of a dedicated pilot's channelization codes is {0,1,2,3}. In addition, the number of dedicated pilots is the same as that of data layers. Therefore, if the number of a dedicated pilot's channelization codes (or the number of data layers) included in the HS-SCCH is 2, and an initial offset is 0, serial numbers of the determined dedicated pilot's channelization codes are 0 and 1. In another example, if the number of a dedicated pilot's channelization codes (or the number of data layers) included in the HS-SCCH is 2, and an initial offset is 1, serial numbers of the determined dedicated pilot's channelization codes are 1 and 2.

After a serial number is determined, code numbers of a dedicated pilot's channelization codes may be further determined according to the correspondence between code numbers of a dedicated pilot's channelization codes and serial numbers of the dedicated pilot's channelization codes to further determine the dedicated pilot's channelization codes. For example, the determined serial numbers are 0 and 1, which correspond to code numbers a and b respectively. Then, it may be determined that the dedicated pilot's channelization codes are a dedicated pilot's channelization codes whose code numbers are a and b.

Step 24: The UE uses the determined dedicated pilot's channelization codes to perform decoding on a received dedicated pilot.

In this embodiment, a UE obtains a dedicated pilot's channelization codes in a manner that a base station directly indicates a location of a dedicated pilot's channelization codes, so as to further implement decoding of a dedicated pilot.

Figure 3:
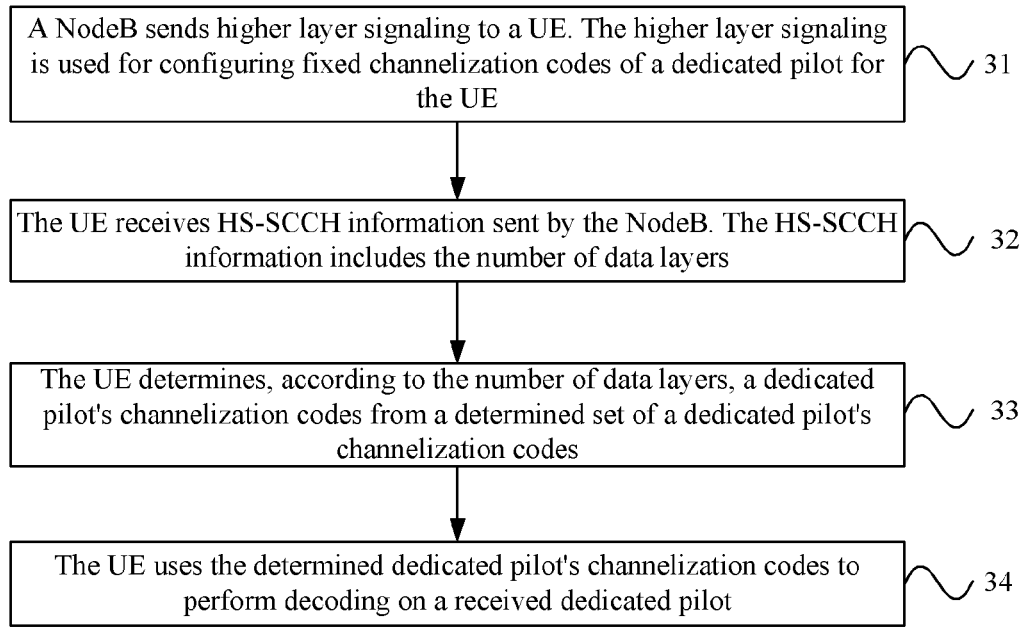
FIG. 3 is a schematic flow chart of a dedicated pilot decoding method according to another embodiment of the present invention.

FIG. 3 is a schematic flow chart of a dedicated pilot decoding method according to another embodiment of the present invention, where the method includes the following steps.

Step 31: A NodeB sends higher layer signaling to a UE. The higher layer signaling is used for configuring fixed channelization codes of a dedicated pilot for the UE.

For example, N fixed channelization codes of a dedicated pilot are configured for the UE through higher layer signaling. N is 4 or the maximum number of data layers supported by the UE.

N channelization codes of a dedicated pilot compose a set of a dedicated pilot's channelization codes. Supposing the set is {0,1,2,3}.

Optionally, as may be shown in the previous embodiment, a fixed SF is directly set in the UE and fixed channelization codes of a dedicated pilot are determined according to the SF. Or, a set of fixed channelization codes of a dedicated pilot is directly configured in the UE.

Step 32: The UE receives HS-SCCH information sent by the NodeB. The HS-SCCH information includes the number of data layers.

The UE may listen for a plurality of HS-SCCHs simultaneously and decodes an HS-SCCH by using its own UE ID after listening for the HS-SCCH. If an HS-SCCH can be successfully decoded, it indicates that the HS-SCCH is correctly received. Information in the correctly received HS-SCCH is used to perform subsequent processing.

Step 33: The UE determines, according to the number of data layers, a dedicated pilot's channelization codes from the determined set of a dedicated pilot's channelization codes.

Supposing the determined set of a dedicated pilot's channelization codes is {0,1,2,3}, when the number of data layers (RI)=1, the serial number of the determined dedicated pilot's channelization code is 0; when the number of data layers is 2, the serial numbers of the determined dedicated pilot's channelization codes are 0 and 1. That is, the same number of dedicated pilots as that of data layers is selected from the set of a dedicated pilot's channelization codes in sequence as the determined dedicated pilot's channelization codes.

Step 34: The UE uses the determined dedicated pilot's channelization codes to perform decoding on a received dedicated pilot.

In this embodiment, a UE determines, through the number of data layers included in the correctly received HS-SCCH, a dedicated pilot's channelization codes from a set of a dedicated pilot's channelization codes, so as to further implement decoding of a dedicated pilot.

Figure 4:
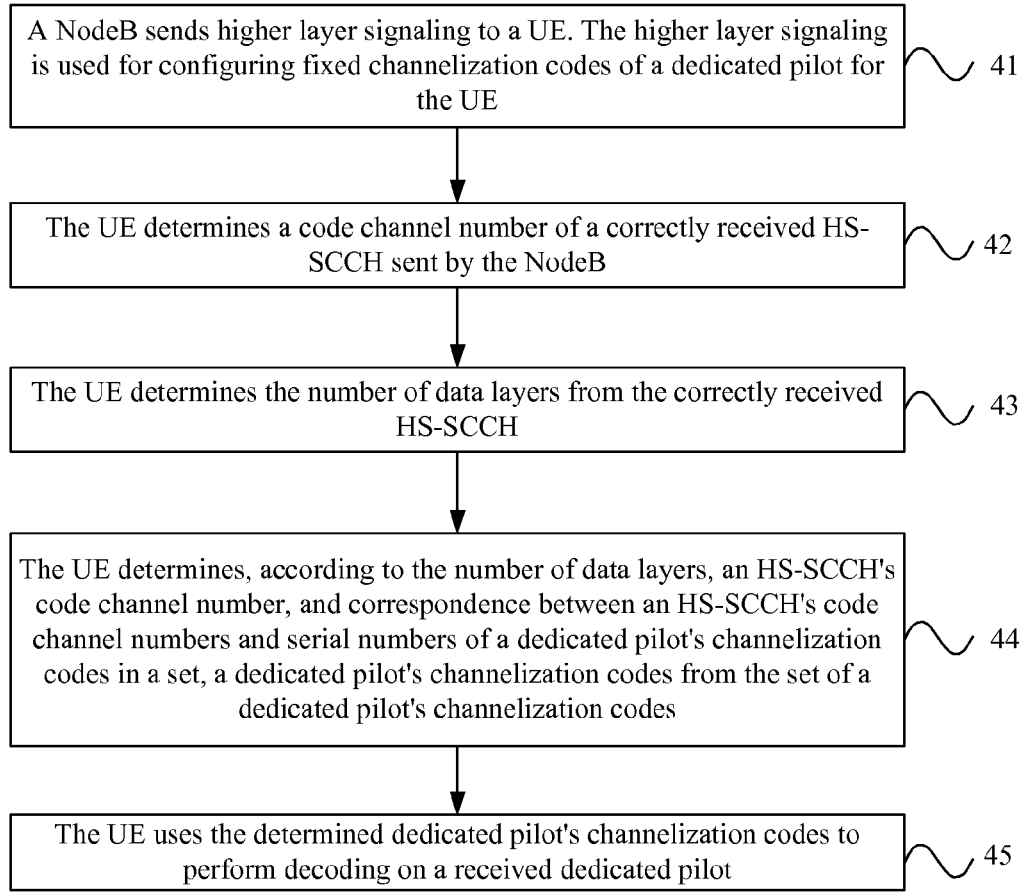
FIG. 4 is a schematic flow chart of a dedicated pilot decoding method according to another embodiment of the present invention.

FIG. 4 is a schematic flow chart of a dedicated pilot decoding method according to another embodiment of the present invention, where the method includes the following steps.

Step 41: A NodeB sends higher layer signaling to a UE. The higher layer signaling is used for configuring fixed channelization codes of a dedicated pilot for the UE.

For details, reference may be made to step 31.

Step 42: The UE determines a code channel number of a correctly received HS-SCCH sent by the NodeB.

The UE may listen for a plurality of HS-SCCHs simultaneously and decodes an HS-SCCH by using its own UE ID after listening for the HS-SCCH. If an HS-SCCH can be successfully decoded, it indicates that the HS-SCCH is correctly received.

Step 43: The UE determines the number of data layers from the correctly received HS-SCCH.

The HS-SCCH may include the number of data layers.

Step 44: The UE determines, according to the number of data layers, a code channel number of an HS-SCCH, and correspondence between an HS-SCCH's code channel numbers and serial numbers of a dedicated pilot's channelization codes in a set, a dedicated pilot's channelization codes from the set of a dedicated pilot's channelization codes.

The UE may first obtain the correspondence between an HS-SCCH's code channel numbers and serial numbers of a dedicated pilot's channelization codes in the set. The correspondence may be obtained by sequencing the code channel numbers of the HS-SCCH correctly received by the UE in ascending order and performing correspondence between the sequenced code channel numbers of the HS-SCCH and the serial numbers of a dedicated pilot's channelization codes in the set of a dedicated pilot's channelization codes. For example, the code channel number of the HS-SCCH correctly received by UE1 is A, the code channel number of the HS-SCCH correctly received by UE2 is B, the code channel number of the HS-SCCH correctly received by UE3 is C, and the code channel number of the HS-SCCH correctly received by UE4 is D, if A<B<C<D, it may be obtained that code channel number A corresponds to a serial number 0, code channel number B corresponds to a serial number 1, code channel number C corresponds to a serial number 2, and code channel number D corresponds to a serial number 3. Then, for a UE, for example, UE1, if the code channel number of the HS-SCCH correctly received by UE1 is A, and the correspondence indicates that the serial number corresponding to A is 0, UE1 will use 0 as a starting point in the determined set of a dedicated pilot's channelization codes to select the same number of dedicated pilot's channelization codes as that of data layers.

For example, supposing the determined set of a dedicated pilot's channelization codes is {0,1,2,3}, and the number of data layers is 2, when the code channel number of the correctly received HS-SCCH is A, and the serial number corresponding to A is 0, the serial numbers of the determined dedicated pilot's channelization codes are 0 and 1. In another example, when the code channel number of the correctly received HS-SCCH is B, and the serial number corresponding to B is 1, the serial numbers of the determined dedicated pilot's channelization codes are 1 and 2. That is, a serial number corresponding to the code channel number of the HS-SCCH is used as an initial location to select the same number of dedicated pilot's channelization codes as that of data layers from the set of a dedicated pilot's channelization codes in sequence as the determined dedicated pilot's channelization codes.

Step 45: The UE uses the determined dedicated pilot's channelization codes to perform decoding on a received dedicated pilot.

In this embodiment, a UE determines, through a code channel number of the correctly received HS-SCCH and the number of data layers included in the HS-SCCH, a dedicated pilot's channelization codes from a set of a dedicated pilot's channelization codes, so as to further implement decoding of a dedicated pilot.

Figure 5:
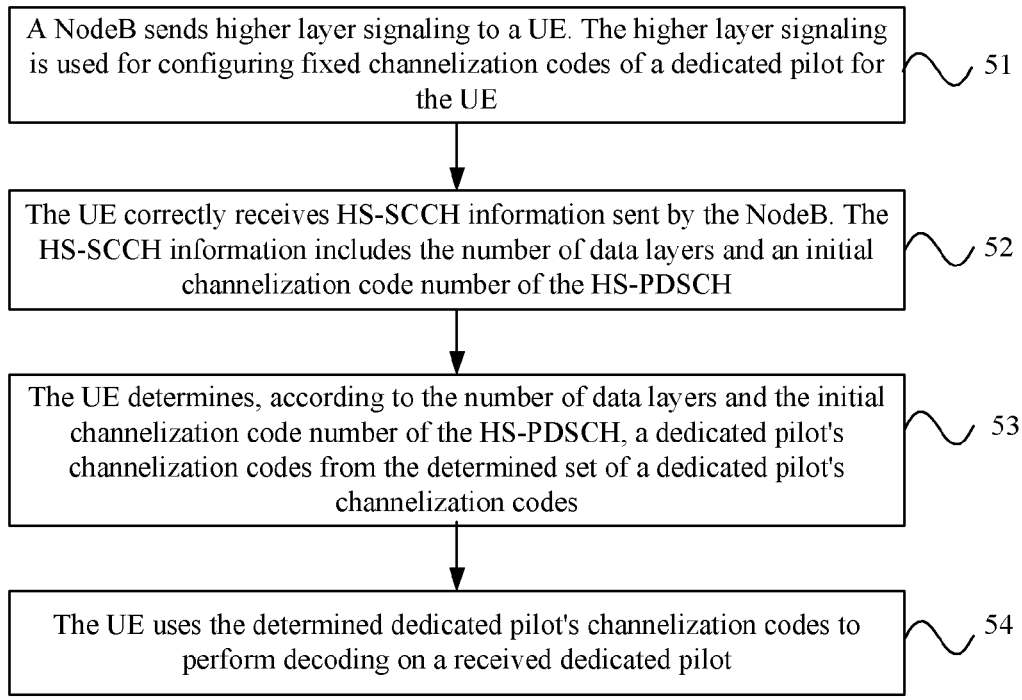
FIG. 5 is a schematic flow chart of a dedicated pilot decoding method according to another embodiment of the present invention.

FIG. 5 is a schematic flow chart of a dedicated pilot decoding method according to another embodiment of the present invention, where the method includes the following steps.

Step 51: A NodeB sends higher layer signaling to a UE. The higher layer signaling is used for configuring fixed channelization codes of a dedicated pilot for the UE.

For details, reference may be made to step 31.

Step 52: The UE correctly receives HS-SCCH information sent by the NodeB. The HS-SCCH information includes the number of data layers and an initial channelization code number of the HS-PDSCH.

Step 53: The UE determines, according to the number of data layers and the initial channelization code number of the HS-PDSCH, a dedicated pilot's channelization codes from the determined set of a dedicated pilot's channelization codes.

Supposing the determined set of a dedicated pilot's channelization codes is {0,1,2,3}, and the number of data layers is 2, when an initial channelization code number of an HS-PDSCH is 0, the serial numbers of the determined dedicated pilot's channelization codes are 0 and 1. In another example, when an initial channelization code number of an HS-PDSCH is 1, the serial numbers of the determined dedicated pilot's channelization codes are 1 and 2. That is, n initial channelization code number of an HS-SCCH is used as an initial location to select, from the set of a dedicated pilot's channelization codes, the same number of dedicated pilot's channelization codes as that of the data layers in sequence as the determined dedicated pilot's channelization codes.

Step 54: The UE uses the determined dedicated pilot's channelization codes to perform decoding on a received dedicated pilot.

In this embodiment, a UE determines, through a channelization code number of an HS-PDSCH in the correctly received HS-SCCH and the number of data layers included in the correctly received HS-SCCH, a dedicated pilot's channelization codes from a set of a dedicated pilot's channelization codes, so as to further implement decoding of a dedicated pilot.

Figure 6:
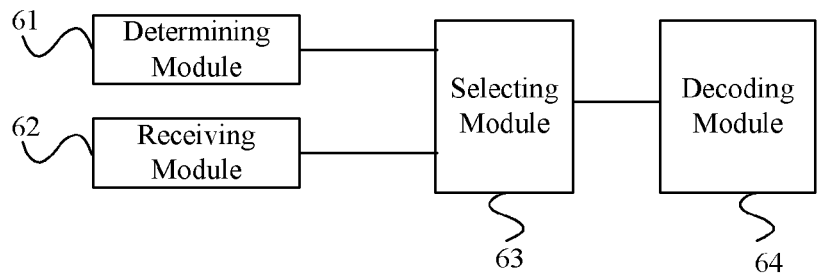
FIG. 6 is a schematic structural diagram of a user equipment according to an embodiment of the present invention.

FIG. 6 is a schematic structural diagram of a user equipment according to an embodiment of the present invention, including a determining module 61, a receiving module 62, a selecting module 63, and a decoding module 64. The determining module 61 is configured to determine a set of a dedicated pilot's channelization codes. The receiving module 62 is configured to receive downlink control information sent by a base station. The selecting module 63 is configured to determine, according to the downlink control information received by the receiving module 62, a dedicated pilot's channelization codes from the set of a dedicated pilot's channelization codes determined by the determined module 61. The decoding module 64 is configured to decode a dedicated pilot by using the dedicated pilot's channelization codes obtained by the selecting module 63.

Optionally, the determining module is specifically configured to: preset a set of a dedicated pilot's channelization codes; or receive higher layer signaling sent by the base station. The higher layer signaling is used for configuring fixed channelization codes of a dedicated pilot for the UE. The fixed channelization codes of a dedicated pilot compose the set of a dedicated pilot's channelization codes.

Optionally, the receiving module is specifically configured to correctly receive an HS-SCCH sent by the base station. The correctly received HS-SCCH explicitly or implicitly includes information that is used for indicating locations of a dedicated pilot's channelization codes in the set of a dedicated pilot's channelization codes. The selecting module is specifically configured to determine, according to the information that is used for indicating the locations of a dedicated pilot's channelization codes in the set of a dedicated pilot's channelization codes, corresponding dedicated pilot's channelization codes from the set of a dedicated pilot's channelization codes.

Optionally, the information that is used for indicating the locations of a dedicated pilot's channelization codes includes: the number and an initial offset of a dedicated pilot's channelization codes, or, an initial offset of a dedicated pilot's channelization codes and the number of data layers.

Optionally, the downlink control information includes the number of data layers.

The selecting module is specifically configured to select, the same number of dedicated pilot's channelization codes as that of data layers in sequence from the set of a dedicated pilot's channelization codes as the determined dedicated pilot's channelization codes.

Optionally, the downlink control information is borne on an HS-SCCH, the receiving module is further configured to determine code channel numbers of the HS-SCCH where the correctly configured downlink control information is borne. The selecting module is specifically configured to select, according to the HS-SCCH's code channel number and the correspondence between the HS-SCCH's code channel numbers and serial numbers of a dedicated pilot's channelization codes in the set of a dedicated pilot's channelization codes, and by using a dedicated pilot's channelization codes indicated by the serial number corresponding to the code channel number of the HS-SCCH as an initial location, the same number of a dedicated pilot's channelization codes as that of the data layers in sequence from the set of dedicated pilot's channelization codes as the determined dedicated pilot's channelization codes.

Furthermore, the selecting module is further configured to obtain the correspondence between an HS-SCCH's code channel numbers and the serial numbers of a dedicated pilot's channelization codes in the set of a dedicated pilot's channelization codes. The correspondence is obtained by sequencing code channel numbers of the HS-SCCH correctly received by a UE in ascending order and performing correspondence between the sequenced code channel numbers of the HS-SCCH and the serial numbers of a dedicated pilot's channelization codes in the set of a dedicated pilot's channelization codes.

Optionally, the receiving module is specifically configured to correctly receive an HS-SCCH sent by the base station. The correctly received HS-SCCH includes an initial channelization code number of an HS-PDSCH and the number of data layers of an HS-PDSCH. The selecting module is specifically configured to use an initial channelization code number of the HS-PDSCH as an initial serial number to select the same number of a dedicated pilot's channelization codes as that of the data layers in sequence from the set of a dedicated pilot's channelization codes as the determined dedicated pilot's channelization codes.

In this embodiment, a used dedicated pilot's channelization codes are determined from the set of a dedicated pilot's channelization codes through downlink control information, so as to further implement decoding of a dedicated pilot.

Persons of ordinary skill in the art may understand that all or a part of the steps in each of the foregoing method embodiments may be implemented by a program instructing relevant hardware. The program may be stored in a computer readable storage medium. When the program is run, the steps of the forgoing methods in the embodiments are performed. The storage medium includes any medium that is capable of storing program codes, such as a ROM, a RAM, a magnetic disk, or an optical disk.

Finally, it should be noted that the foregoing embodiments are merely intended for describing the technical solutions of the present invention, rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof; without departing from the scope of the technical solutions of the embodiments of the present invention.

What is claimed is:

1. A method of decoding a dedicated pilot, comprising:
   determining a set of channelization codes of the dedicated pilot;
   receiving downlink control information sent by a base station;
   selecting, according to the downlink control information, channelization codes of the dedicated pilot from the set of a channelization codes of the dedicated pilot; and
   using the selected channelization codes of the dedicated pilot to decode the dedicated pilot.

2. The method according to claim 1, wherein the determining the set of the channelization codes of the dedicated pilot comprises:
   presetting the set of the channelization codes of the dedicated pilot; or
   receiving higher layer signaling sent by the base station, wherein the higher layer signaling is used for configuring fixed channelization codes of the dedicated pilot for a user equipment (UE), and the fixed channelization codes of the dedicated pilot compose the set of the channelization codes of the dedicated pilot.

3. The method according to claim 1, wherein:
   the receiving the downlink control information sent by the base station comprises:
      correctly receiving a high speed shared control channel (HS-SCCH) sent by the base station, wherein the correctly received HS-SCCH includes information for indicating one or more locations of the channelization codes of the dedicated pilot the set of the channelization codes of the dedicated pilot; and
   the selecting, according to the downlink control information, the channelization codes of the dedicated pilot from the set of the channelization codes of the dedicated pilot comprises:
      determining, as the selected channelization codes of the dedicated pilot, channelization codes of the dedicated pilot from the set of the channelization codes of the dedicated pilot which correspond to the information for indicating the one or more locations.

4. The method according to claim 3, wherein the information that is used for indicating the one or more locations of channelization codes of the dedicated pilot in the set of the channelization codes of the dedicated pilot comprises:
   a number of the channelization codes of the dedicated pilot and an initial offset, or
   an initial offset and a number of data layers.

5. The method according to claim 1, wherein:
   the downlink control information includes a number of data layers, and
   the selecting, according to the downlink control information, the channelization codes of the dedicated pilot from the set of the channelization codes of the dedicated pilot comprises:
      selecting as the selected channelization codes of the dedicated pilot, in sequence from the set of the channelization codes of the dedicated pilot, a same number of channelization codes of the dedicated pilot as the number of data layers.

6. The method according to claim 1, wherein:
   the downlink control information is borne on a high speed shared control channel (HS-SCCH), and the method further comprises:
      determining code channel numbers of the HS-SCCH where the downlink control information is borne, wherein the HS-SCCH includes a number of data layers; and
   the selecting, according to the downlink control information, the channelization codes of the dedicated pilot from the set of the channelization codes of the dedicated pilot comprises:
      selecting, according to a correspondence between the code channel numbers of the HS-SCCH and serial numbers of the channelization codes of the dedicated pilot in the set of the channelization codes of the dedicated pilot, by using the corresponding channelization codes of the dedicated pilot in the set of the channelization codes of the dedicated pilot as an initial location, and from the set of channelization codes of the dedicated pilot in sequence starting at the initial location, a same number of channelization codes of the dedicated pilot as the number of data layers as the selected channelization codes of the dedicated pilot.

7. The method according to claim 6, further comprising:
   obtaining the correspondence between the code channel numbers of the HS-SCCH and the serial numbers of channelization codes of the dedicated pilot in the set of the channelization codes of the dedicated pilot by sequencing the code channel numbers of the HS-SCCH correctly received by a user equipment (UE) in ascending order and determining a correspondence between the sequenced code channel numbers of the HS-SCCH and the serial numbers of the channelization codes of the dedicated pilot in the set of the channelization codes of the dedicated pilot.

8. The method according to claim 1, wherein:
   the receiving downlink control information sent by a base station comprises:
      correctly receiving a high speed shared control channel (HS-SCCH) sent by the base station, wherein the correctly received HS-SCCH includes an initial code channel number of a high speed physical downlink shared channel (HS-PDSCH) and a number of data layers; and
   the selecting, according to the downlink control information, a channelization codes of the dedicated pilot from the set of the channelization codes of the dedicated pilot comprises:
      using the initial code channel number of the HS-PDSCH as an initial location to select a same number of channelization codes of the dedicated pilot as the number of data layers in sequence from the set of the channelization codes of the dedicated pilot as the selected channelization codes of the dedicated pilot.

9. A user equipment (UE), comprising:
   at least one hardware processor;
   a memory interfaced to the at least one hardware processor, the memory including instructions executable to control the at least one hardware processor to:
      determine a set of channelization codes of the dedicated pilot;

receive downlink control information sent by a base station;

select, according to the received downlink control information channelization codes of the dedicated pilot from the determined set of the channelization codes of the dedicated pilot; and decode the dedicated pilot by using the selected channelization codes of the dedicated pilot.

10. The UE according to claim 9, wherein the determining the set of the channelization codes of the dedicated pilot:

presets the set of the channelization codes of the dedicated pilot; or receives higher layer signaling sent by the base station, wherein the higher layer signaling is used for configuring fixed channelization codes of the dedicated pilot for the UE, and the fixed channelization codes of a dedicated pilot compose the determined set of the channelization codes of the dedicated pilot.

11. The UE according to claim 9, wherein:

the receiving the downlink control information sent by a base station correctly receives a high speed shared control channel (HS-SCCH) sent by the base station, wherein the correctly received HS-SCCH includes information for indicating one or more locations of channelization codes of the dedicated pilot in the determined set of the channelization codes of the dedicated pilot; and the determining, as the selected channelization codes of the dedicated pilot, channelization codes of the dedicated pilot from the determined set of the channelization codes of the dedicated pilot which correspond to the information for indicating the one or more locations.

12. The UE according to claim 9, wherein:

the downlink control information includes the number of data layers, and the selecting the channelization codes of the dedicated pilot selects as the selected channelization codes of the dedicated pilot, in sequence from the determined set of the channelization codes, a same number of channelization codes of the dedicated pilot as the number of data layers.

13. The UE according to claim 9, wherein:

the downlink control information includes the number of data layers, the receiving the downlink control information sent by a base station determines code channel numbers of a high speed shared control channel (HS-SCCH) on which the received downlink control information is borne, wherein the HS-SCCH includes the number of data layers; and the selecting the channelization codes of the dedicated pilot selects as the selected channelization codes of the dedicated pilot, according to a correspondence between the code channel numbers of the HS-SCCH and serial numbers of channelization codes of the dedicated pilot in the determined set of the channelization codes of the dedicated pilot, by using a corresponding channelization codes of the dedicated pilot in the determined set of the channelization codes of the dedicated pilot as an initial location, and from the determined set of the channelization codes of the dedicated pilot in sequence starting at the initial location, a same number of channelization codes of the dedicated pilot as the number of data layers.

14. The UE according to claim 13, wherein the selecting the channelization codes of the dedicated pilot obtains the correspondence between the code channel numbers of the HS-SCCH and the serial numbers of channelization codes of the dedicated pilot in the determined set of the channelization codes of the dedicated pilot, wherein the correspondence is obtained by sequencing the code channel numbers of the HS-SCCH correctly received by the UE in ascending order and determining correspondence between the sequenced code channel numbers of the HS-SCCH and the serial numbers of channelization codes of the dedicated pilot in the determined set of the channelization codes of the dedicated pilot.

15. The UE according to claim 9, wherein:

the receiving the downlink control information sent by a base station correctly receives a high speed shared control channel (HS-SCCH) sent by the base station, wherein the correctly received HS-SCCH includes an initial code channel number of a high speed physical downlink shared channel (HS-PDSCH) and a number of data layers; and the selecting the channelization codes of the dedicated pilot selects, by using the initial code channel number of the HS-SCCH as an initial serial number, a same number of channelization codes of the dedicated pilot as the number of data layers from the determined set of the channelization codes of the dedicated pilot in sequence as the selected channelization codes of the dedicated pilot.

* * * * *